US011068354B1

(12) United States Patent
Ugur-Ozekinci et al.

(10) Patent No.: US 11,068,354 B1
(45) Date of Patent: Jul. 20, 2021

(54) SNAPSHOT BACKUPS OF CLUSTER DATABASES

(71) Applicant: EMC IP Holding Company LLC, Hopkinton, MA (US)

(72) Inventors: Yasemin Ugur-Ozekinci, Oakville (CA); Yaron Dar, Sudbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 639 days.

(21) Appl. No.: 15/876,634

(22) Filed: Jan. 22, 2018

(51) Int. Cl.
*G06F 16/23* (2019.01)
*G06F 16/28* (2019.01)
*G06F 16/11* (2019.01)
*G06F 11/14* (2006.01)

(52) U.S. Cl.
CPC ...... *G06F 11/1469* (2013.01); *G06F 11/1471* (2013.01); *G06F 16/128* (2019.01); *G06F 16/23* (2019.01); *G06F 16/285* (2019.01); *G06F 2201/80* (2013.01); *G06F 2201/82* (2013.01); *G06F 2201/84* (2013.01)

(58) Field of Classification Search
CPC ...... G06F 16/128; G06F 16/184; G06F 16/23; G06F 16/285; G06F 11/1469; G06F 2201/84; G06F 2201/82
USPC .................................................. 707/639, 652
See application file for complete search history.

(56) References Cited

U.S. PATENT DOCUMENTS

| 10,754,844 | B1* | 8/2020 | Jain | G06F 16/2358 |
| 2007/0168692 | A1* | 7/2007 | Quintiliano | G06F 11/1662 |
| | | | | 714/4.1 |
| 2009/0198945 | A1* | 8/2009 | Sekhar | G06F 12/0804 |
| | | | | 711/171 |
| 2011/0071981 | A1* | 3/2011 | Ghosh | G06F 16/27 |
| | | | | 707/634 |
| 2013/0212068 | A1* | 8/2013 | Talius | G06F 16/1734 |
| | | | | 707/639 |
| 2017/0132429 | A1* | 5/2017 | Bell | H04L 9/0861 |

* cited by examiner

*Primary Examiner* — Dangelino N Gortayo
(74) *Attorney, Agent, or Firm* — Dergosits & Noah LLP; Todd A. Noah (57) ABSTRACT

A system identifies a storage device that stores a computer cluster's database and a storage device that stores the computer cluster's transaction logs. The system creates a snapshot of the storage device that stores the database and/or a snapshot of the storage device that stores the transaction logs. The system mounts at least one snapshot on any host that is accessible to the data management system's native interface. The system enables the native interface to catalog a database recovery name created for the database snapshot and/or a transaction log recovery name created for the transaction logs snapshot. The system enables recovery of the database and/or the transaction logs by storing a mapping from the database recovery name to a database backup identifier created for the database snapshot and/or a mapping from the transaction log recovery name to a transaction log backup identifier created for the transaction logs snapshot.

20 Claims, 3 Drawing Sheets

SNAPSHOT BACKUPS OF CLUSTER DATABASES

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup/restore application to execute a restore operation to restore a copy of the corresponding backup files for that state to the data object.

A computer system can provide a single instance of database management system software that accesses a database, which stores a collection of data files, control files, and transaction files. A computer cluster can provide multiple computers that run multiple instances of a database management system software simultaneously while accessing a single database. Since an application or a user can connect to any of the cluster's computers, the cluster provides a high availability of access to a single coordinated set of data.

DETAILED DESCRIPTION

A database management system may have a native interface that can integrate with a third-party backup/recovery application to backup and recover the data in its database. For example, an Oracle relational database management system has a native recovery manager (RMAN) that enables a database administrator to perform database backup and recovery with either native or third-party vendor backup technology, such as the EMC Networker backup/restore application which uses snapshots, to backup and recover the data in the Oracle database, without the database administrator needing to know the details of the Oracle database's logical storage or physical storage devices. However, a database management system's native interface for a computer cluster may not integrate with a third-party backup/recovery application that uses snapshots to backup and recover the data in a cluster's database. For example, Oracle's recovery manager does not enable a database administrator to integrate with EMC's Networker to use snapshots to backup and recover the data stored by Oracle's Automatic Storage Management (ASM) tools that are used by Oracle's Real Application Clusters (RAC) environment. A database administrator can create a scripting solution that uses snapshots to backup and recover a computer cluster's data. However, a scripting solution would require a database administrator to have detailed knowledge of the dynamically changing Oracle ASM disk groups and their corresponding physical storage devices, and the scripting solution would not integrate with the Oracle recovery manager. A stream-based solution can integrate with a native interface by taking a temporary snapshot of a cluster database, and then copying every block from the snapshot in a non-production host's storage to a protection storage over an Internet Protocol (IP) or a Fiber Channel (FC). However, the stream-based solution's block-moving process may require many hours instead of the near-instantaneous creation of a snapshot.

Embodiments herein provide snapshot backups of cluster databases. A system identifies a storage device that stores a computer cluster's database and a storage device that stores the computer cluster's transaction logs. The system creates a snapshot of the storage device that stores the database and a snapshot of the storage device that stores the transaction logs. The system mounts at least one snapshot on any host that is accessible to the database management system's native interface. The system enables the native interface to catalog a database recovery name created for the database snapshot and/or a transaction log recovery name created for the transaction logs snapshot. The system enables recovery of the database and/or the transaction logs by storing a mapping from the database recovery name to a database backup identifier created for the database snapshot and/or a mapping from the transaction log recovery name to a transaction log backup identifier created for the transaction logs snapshot.

For example, an EMC Networker backup/restore application identifies a computer cluster's logical groups that store an Oracle database and Oracle archived redo logs, and mappings from the logical groups to disk 1 that stores the Oracle database and to disk 2 that stores the Oracle archived redo logs. The EMC Networker application creates a snapshot of disk 1 that stores the Oracle database and a snapshot of disk 2 that stores the Oracle archived redo logs. The EMC Networker application mounts the snapshots on a cluster host that is accessible to the Oracle recovery manager. The EMC Networker application prompts the Oracle recovery manager to catalog the Oracle database snapshot under the name "Oracle Database Jan. 8, 2018 @ 5:00 PM" and the Oracle redo log snapshot under the name "Oracle redo logs Jan. 8, 2018 @ 5:00 PM." The EMC Networker application enables recovery of the Oracle database and the Oracle archived redo logs by storing a mapping from the Oracle recovery manager's name "Oracle Database Jan. 8, 2018 @ 5:00 PM" to the EMC Networker identifier snap/18/01/08/1700/odb for the Oracle database snapshot and a mapping from the Oracle recovery manager's name "Oracle redo logs Jan. 8, 2018 @ 5:00 PM" to the EMC Networker identifier snap/18/01/08/1700/ordl for the Oracle redo log snapshot.

The system provides the near-instantaneous creation of snapshots, and integrates with the database management system's native interface, without requiring a database administrator to have detailed knowledge of the storage manager's dynamically changing logical groups or their corresponding physical storage devices. The native interface can read data required for recovery directly from mounted snapshots without knowing that the snapshots are mounted from a third-party's protection storage.

Figure 1:
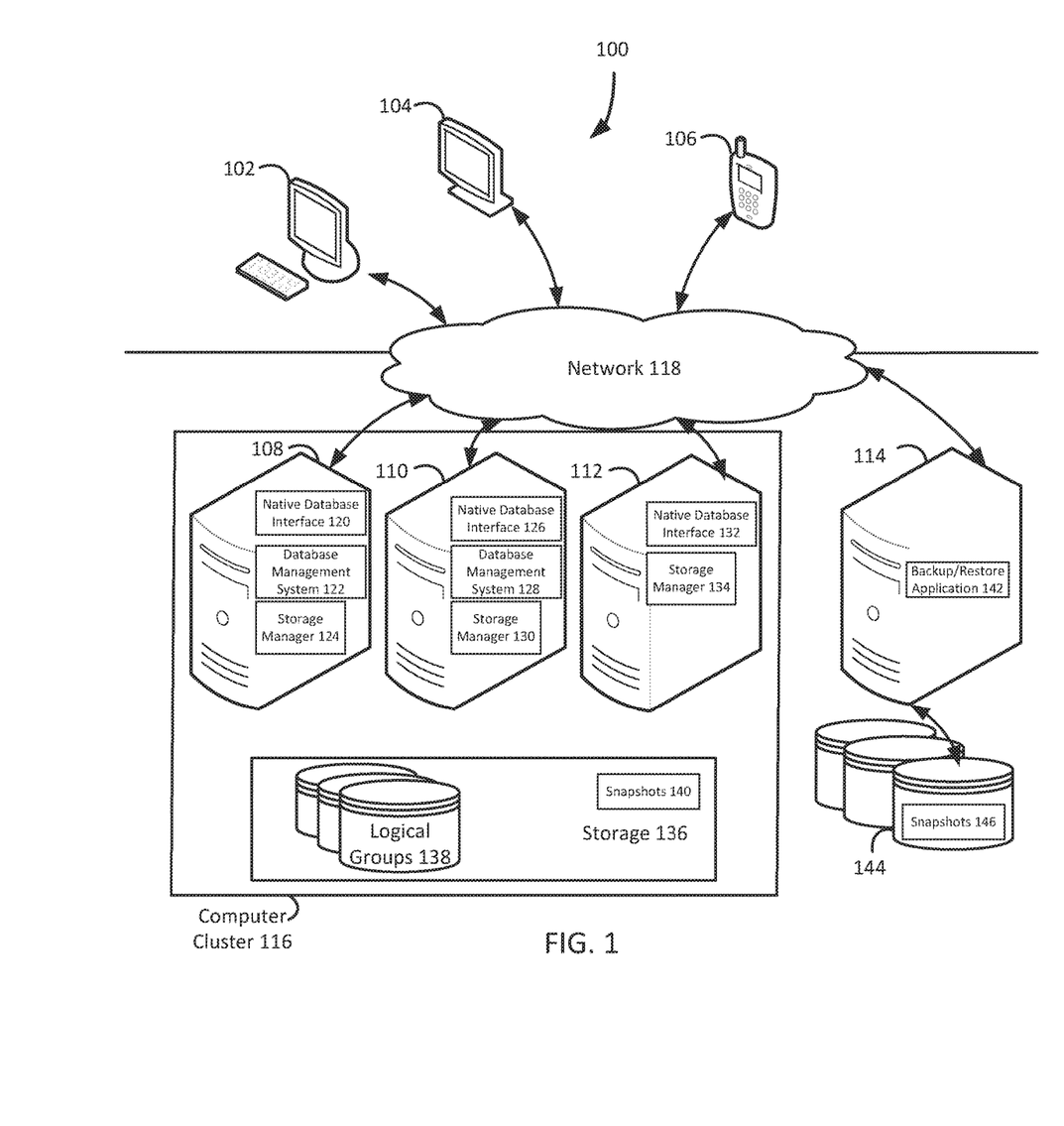
FIG. 1 illustrates a block diagram of an example system for snapshot backups of cluster databases, under an embodiment.

FIG. 1 illustrates a block diagram of a system that implements snapshot backups of cluster databases, under an embodiment. As shown in FIG. 1, system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a first server 108, a second server 110, a third server 112, and a fourth server 114 that may be provided by a hosting company. The servers 108-112 comprise a computer cluster 116, which does not include the fourth server 114. Therefore, the servers 108-112 may be referred to as the nodes 108-112 or the hosts 108-112 in the computer cluster 116. The clients 102-106 and the servers 108-114 communicate via a network 118. Although FIG. 1 depicts the system 100 with three clients 102-106, four servers 108-114, one cluster 116, and one network 118, the system 100 may include any number of clients 102-106, any number of servers 108-114, any number of clusters 116, and any number of networks 118. The clients 102-106 and the servers 108-114 may each be substantially similar to the system 300 depicted in FIG. 3 and described below in reference to FIG. 3.

The first server 108 includes a first native database interface 120, a first database management system 122, and a first storage manager 124; the second server 110 includes a second native database interface 126, a second database management system 128, and a second storage manager 130; and the third server 112 includes a third native database interface 132 and a third storage manager 134. The native database interfaces 120, 126, and 132 may be Oracle recovery managers 120, 126, and 132. The database management systems 122 and 128 may be Oracle relational database management systems 122 and 128. The storage managers 124, 130, and 134 may be Oracle Automatic Storage Management (ASM) tools 124, 130, and 134. The computer cluster 116 includes first storage 136 for the servers 108-112, the first storage 136 includes logical groups 138 and stores first snapshots 140, and the logical groups 138 include physical storage devices. The fourth server 114 includes a backup/restore application 142 that uses a second storage 144 to store second snapshots 146. The first storage 136 may be referred to as cluster storage 136, which includes production storage, and the second storage 144 may be referred to as protection storage 144 or remote storage 144. The first snapshots 140 may be referred to as short-term snapshots 140 and the second snapshots 146 may be referred to as long-term snapshots 146.

FIG. 1 depicts the system 100 with three native database interfaces 120, 126, and 132, two database management systems 122 and 128, three storage managers 124, 130, and 134, two storages 136 and 144, one set of logical groups 138, two collections of snapshots 140 and 146, and one backup/restore application 142. However, the system 100 may include any number of native database interfaces 120, 126, and 132, any number of database management systems 122 and 128, any number of storage managers 124, 130, and 134, any number of storages 136 and 144, any number of sets of logical groups 138, any number of collections of snapshots 140 and 146, and any number of backup/restore applications 142.

FIG. 1 depicts the backup/restore application 142 residing completely on the fourth server 114, but the backup/application 142 may reside completely on any of the servers 108-112, completely on any of the clients 102-106, completely on another server that is not depicted in FIG. 1, or in any combination of partially on the servers 108-114, partially on the clients 102-106, and partially on the other server. The backup/restore application 142 may provide a plug-in to any of the clients 102-106 and/or any of the servers 108-114 that enables any of the clients 102-106 and/or any of the servers 108-114 to execute the commands to back up and recover a database and its transaction logs. Even though the following paragraphs describe EMC Corporation's NetWorker® backup/restore application as an example of the backup/restore application 142, the backup/restore application 142 may be any other backup/restore application which provides the backup/restore functionalities described in the Background section.

The backup/restore application 142 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data may be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers. Although the functionality examples described in this paragraph apply to EMC Corporation's NetWorker® backup/restore application, one of skill in the art would recognize that other backup/restore applications and their corresponding functionalities may be used. The backup/restore application 142 may also be implemented as a NetWorker® Module For Microsoft Applications, which, as stated above, may reside completely on any of the servers 108-114, completely on any of the clients 102-106, completely on another server that is not depicted in FIG. 1, or in any combination of partially on the servers 108-114, partially on the clients 102-106, and partially on the other server.

The system 100 identifies a storage device that stores a database associated with a computer cluster and/or a storage device that stores transaction logs associated with the computer cluster. For example, and without limitation, this can include the EMC Networker backup/restore application 142 discovering the computer cluster 116's logical groups 138 that store an Oracle database and Oracle archived redo logs, and mappings from the logical groups 138 to disk 1 that stores the Oracle database and to disk 2 that stores the Oracle archived redo logs. In another example, the EMC Networker backup/restore application 142 discovers the computer cluster 116's logical groups 138 that store Oracle archived redo logs, and a mapping from the logical groups 138 to disk 2 that stores the Oracle archived redo logs. The system 100 may identify storage devices that store databases and transaction logs on a periodic basis, as needed, and/or on demand. For example, the EMC Networker backup/restore application 142 discovers a cluster's storage devices that store the cluster's database and transaction logs each day at 5:00 PM, and then discovers the cluster's storage devices that store the cluster's transaction logs every hour afterwards. A storage device can be a piece of computer equipment on which information can be persisted. A computer cluster can be a set of loosely or tightly connected electronic devices that work together so that, in many respects, they may be viewed as a single system. A database can be a structured set of information held in a computer, especially one that is accessible in various ways. A transaction log can be a file listing changes to a database, stored in a stable storage format.

Having identified a storage device that stores a database and/or a storage device that stores transaction logs, the system 100 creates a snapshot of the storage device that stores the database and/or a snapshot of the storage device that stores the transaction logs. By way of example and without limitation, this can include the EMC Networker application 142 creating a snapshot of disk 1 that stores the Oracle database and a snapshot of disk 2 that stores the Oracle archived redo logs on Jan. 8, 2018, at 5:00 PM. In another example, the EMC Networker application 142 creates a snapshot of disk 2 that stores the Oracle archived redo logs on Jan. 8, 2018, at 6:00 PM. A snapshot can be a record of the contents of a storage location or data file at a given time.

Creating a snapshot of a storage device that stores a database may include quiescing the database before creating the snapshot of the storage device that stores the database and then un-quiescing the database after creating the snapshot of the storage device that stores the database. For example, the EMC Networker application 142 puts the Oracle database in hot backup mode, creates a snapshot of disk 1 that stores the Oracle database on Jan. 8, 2018, at 5:00 PM, and then takes the Oracle database out of hot backup mode. Some databases need to be quiesced to ensure that sequence numbers are added to identify data being changed and the transaction logs that reflect these changes. Therefore, snapshots of a database and transaction logs may be orchestrated to ensure that data being captured is application consistent and recoverable up to any point in time. For example, after creating the snapshot of disk 1 that stores the Oracle database and taking the Oracle database out of hot backup mode, the EMC Networker application 142 captures the Oracle redo log stream generated during the hot backup mode to the archived Oracle redo logs on disk 2 on Jan. 8, 2018, at 5:00 PM, and then creates a snapshot of disk 2 that stores the Oracle archived redo logs. Quiescing can be pausing or altering a device or application to achieve a consistent state, usually in preparation for a backup or other maintenance. In software applications that modify information stored on persistent storage, quiescing generally involves flushing any outstanding writes.

Creating a snapshot of a storage device that stores a database and/or a snapshot of a storage device that stores transaction logs may include copying the snapshot of the storage device that stores the database and/or the snapshot of the storage device that stores the transaction logs to a remote storage. For example, after creating a snapshot of disk 1 that stores the Oracle database and a snapshot of disk 2 that stores the Oracle archived redo logs on Jan. 8, 2018, at 5:00 PM in the short-term snapshots 140 in the cluster storage 136, the EMC Networker application 142 stores copies of these snapshots in the long-term snapshots 146 in the protection storage 144. While the cluster storage 136 has limited capacity for storing the short-term snapshots 140, the protection storage 144 has capacity for storing the long-term snapshots 146 on a long-term basis. A remote storage can be the retention of retrievable data on a computer that can only be accessed by means of a network.

After creating at least one snapshot, the system 100 mounts at least one snapshot on any host that is accessible to a native interface for a management system of the database. In embodiments, this can include the EMC Networker application 142 mounting the short-term snapshots 140 of the Oracle database and the Oracle redo logs on Jan. 8, 2018, at 5:00 PM to the third server 112 that is accessible by the third Oracle recovery manager 132. In another example, the EMC Networker application 142 mounts the short-term snapshots 140 of the Oracle redo logs on Jan. 8, 2018, at 6:00 PM to the third server 112 that is accessible by the third Oracle recovery manager 132. In these examples, the short-term snapshots 140 are mounted to the third server 112 because the third server 112 is a non-production server due to the lack of a database management system, but the short-term snapshots 140 may be mounted to either the first server 108 or the second server 110 that are production servers due to their respective database management systems 122 and 128. Alternatively, the EMC Networker application 142 mounts the long-term snapshots 146 of the Oracle database and the Oracle redo logs on Jan. 8, 2018, at 5:00 PM, and the Oracle redo logs on Jan. 8, 2018, at 6:00 PM to the third server 112 that is accessible by the third Oracle recovery manager 132. Mounting can be the process of making a file system accessible. A host can be a computer that mediates multiple access to databases mounted on the computer, or provides other services to a computer network. A native interface can be a programming framework that enables code to call and be called by programs specific to a hardware and operating system platform. A management system of a database can be software that handles the storage, retrieval, and updating of information in a group of related hardware units or programs or both, especially when dedicated to a single application.

Following the mounting of at least one snapshot, the system 100 enables a native interface to catalog a database recovery name created for a snapshot of a storage device that stores a database and/or a transaction log recovery name created for a snapshot of a storage device that stores transaction logs. For example, and without limitation, this can include the EMC Networker application 142 prompting the Oracle recovery manager 132 to catalog the 5:00 PM Oracle database snapshot under the name "Oracle Database Jan. 8, 2018 @ 5:00 PM" and the 5:00 PM Oracle redo log snapshot under the name "Oracle redo logs Jan. 8, 2018 @ 5:00 PM." In another example, the EMC Networker application 142 prompts the Oracle recovery manager 132 to catalog 6:00 PM Oracle redo log snapshot under the name "Oracle redo logs Jan. 8, 2018 @ 6:00 PM." A database recovery name can be words used to refer to a structured set of information that may be used to return a computer to a normal state. A transaction log recovery name can be words used to refer to database changes listed in a file that may be used to return a computer to a normal state.

When the system 100 creates snapshots of storage devices that store the database and transaction logs, the system 100 creates backups that has no visibility to database administrators to list and restore their backups through their own native database interface. This is why the system 100 not only creates the snapshots of the database and transaction logs, but also mounts the snapshots for the native database interface to catalog. While the native database interface has no option to catalog snapshots taken by third-party vendors, the native database interface has an option to catalog the backups of databases and transaction logs created by a native copy operation. Therefore, the system 100 mounts the snapshots using the storage manager, such as Oracle's ASM tool, in a way that the native database interface thinks that the snapshots are just native copies Having cataloged at least one unique name for at least one snapshot, the system 100 enables the recovery of a database and/or transaction logs by storing a mapping from a database recovery name to a database backup identifier created for a snapshot of a storage device that stores the database and/or a mapping from a transaction log recovery name to a transaction log backup identifier created for a snapshot of a storage device that stores transaction logs. By way of example and without limitation, this can include the EMC Networker application 142 enabling recovery of the 5:00 PM Oracle database and the 5:00 PM Oracle archived redo logs by storing a mapping from the Oracle recovery manager 132's name "Oracle Database Jan. 8, 2018 @ 5:00 PM" to the EMC Networker identifier snap/18/01/08/1700/odb for the Oracle database snapshot stored in the long-term snapshots 146, and a mapping from the Oracle recovery manager 132's name "Oracle redo logs Jan. 8, 2018 @ 5:00 PM" to the EMC Networker identifier snap/18/01/08/1700/ordl for the Oracle redo log snapshot stored in the long-term snapshots 146. In another example, the EMC Networker application 142 enables recovery of the 6:00 PM Oracle archived redo logs by storing a mapping from the Oracle recovery manager 132's name "Oracle redo logs Jan. 8, 2018 @ 6:00 PM" to the EMC Networker identifier snap/18/01/08/1800/ordl for the Oracle redo log snapshot stored in the long-term snapshots 146. In addition to storing the mappings between unique recovery names and unique backup identifiers, and cataloging the long-term snapshots 146, a backup/restore application can also store metadata for the database, the transaction logs, and the storage managers in remote storage. For example, the protection storage 144 catalogs the metadata for the 5:00 PM Oracle database snapshot, the 5;00 PM and 6:00 PM Oracle redo logs snapshots, and the Oracle ASM tools 124. A recovery can be a return of a computer component to a normal state. A mapping can be an association between an element of one set with one or more elements of another set. A database backup identifier can be a sequence of characters used to refer to an extra copy of a structured set of information that may be used in case the original is lost or damaged. A transaction log backup identifier can be a sequence of characters used to refer to an extra copy of a file listing database changes that may be used in case the original is lost or damaged.

When mounting the snapshots of the database and transaction logs using the storage manager, the system 100 generates unique backup identifiers for the database and the transaction logs in the system 100's own catalog, and then uses these unique backup identifiers as the top-level mount points. This additional cataloging is required because the native database interface only keeps track of a file's location, including mount point, and details about the file backed up in its own catalog, but nothing about the snapshots that are backed up on the protection storage itself. So, the database recovery name is the only piece of information that the native database interface will keep in its catalog that links the backup copy of the database and transaction logs files to the snapshots that the system 100 created and moved to protection storage. By generating these unique backup identifiers, the system 100 establishes a method to locate all the snapshots required to mount for a given particular file copy. The system 100's own catalog has the information about snapshot details, such as all the storage devices included in the snapshots, their location, the owner, etc., on the protection storage, and this catalog links the unique backup identifier to the database recovery names cataloged by the native database interface.

After enabling recovery of at least one snapshot, the system 100 can unmount at least one snapshot. In embodiments, this can include the EMC Networker application 142 releasing system resources by unmounting the 5:00 PM snapshots of the Oracle database and the Oracle redo logs, either immediately after all cataloging is completed, or following the running of validation scripts after all cataloging is completed. In another example, the EMC Networker application 142 releases system resources by unmounting the 6:00 PM snapshot of the Oracle redo logs. Unmounting can be the process of making a file system accessible. After cataloging is done; the system 100 unmounts the snapshots, and the backup is completed. A database administrator can now list their backups and see that they have copies under those mount points. The system 100 unmounts the snapshots when the backup is completed because every time a snapshot is mounted, the snapshot uses resources on protection storage, on primary storage array and/or on the host where the mount happens. However, the system 100 also provide an option to leave the snapshots mounted long enough so a database administrator can run validations on the snapshots before unmounting the snapshots.

During the recovery process, since the snapshots have been unmounted on the database system, the way the system 100 identifies which snapshots to mount back is using the native database interface's preview option. Using the preview results, the system 100 identifies the file paths of all the file copies required by native database interface to restore the specified objects to the specified point in time, extracts the unique backup identifier in that path, extracts the unique list of backup identifiers, and mounts their snapshots under the same unique recovery name using the storage manager. Then the native database interface can access the snapshots locally, as is the snapshots were local copies, without knowing that the snapshots are stored on protection storage, and perform the rest of the recovery operation.

Therefore, following the snapshot backup process, the system 100 can identify any database recovery name and/or any transaction log recovery name selected by a native interface. For example, and without limitation, this can include the EMC Networker application 142 identifying the Oracle recovery manager 132's name "Oracle Database Jan. 8, 2018 @ 5:00 PM," the Oracle recovery manager 132's name "Oracle redo logs Jan. 8, 2018 @ 5:00 PM," and the Oracle recovery manager 132's name "Oracle redo logs Jan. 8, 2018 @ 6:00 PM" previewed by the Oracle recovery manager 120. The Oracle recovery manager 120 previewed these recovery names for a user because the user requested the recovery of the Oracle database to the state it was in on Jan. 8, 2018, at 5:30 PM. Therefore, the Oracle recovery manager 120 reviewed the dates and times of its recovery names and determined that the 5:00 PM snapshots of the Oracle database and redo logs can be used to restore the Oracle database to its state at 5:00 PM, and that the 6:00 PM snapshot of the Oracle redo logs is needed to roll forward the Oracle database from its state at 5:00 PM to its state at 5:30 PM. Selecting can be the identification of something as most suitable.

Having identified at least one selection by a native interface, the system 100 can use at least one mapping to identify at least one snapshot corresponding to at least one selection by native interface. By way of example and without limitation, this can include the EMC Networker application 142 using the mapping from the Oracle recovery manager 132's name "Oracle Database Jan. 8, 2018 @ 5:00 PM" to the EMC Networker identifier snap/18/01/08/1700/odb for the Oracle database snapshot stored in the long-term snapshots 146, the mapping from the Oracle recovery manager 132's name "Oracle redo logs Jan. 8, 2018 @ 5:00 PM" to the EMC Networker identifier snap/18/01/08/1700/ordl for the Oracle redo log snapshot stored in the long-term snapshots 146, and the mapping from the Oracle recovery manager 132's name "Oracle redo logs Jan. 8, 2018 @ 6:00 PM" to the EMC Networker identifier snap/18/01/08/1800/ordl for the Oracle redo log snapshot stored in the long-term snapshots 146.

After identifying any corresponding snapshots, the system 100 can rename at least one snapshot with any database recovery name and/or any transaction log recovery name selected by the native interface. For example and without limitation, this can include the EMC Networker application 142 renaming the Oracle database snapshot identified by snap/18/01/08/1700/odb with the Oracle recovery manager 132's name "Oracle Database Jan. 8, 2018 @ 5:00 PM," renaming the Oracle redo log snapshot identified by snap/18/01/08/1700/ordl with the Oracle recovery manager 132's name "Oracle redo logs Jan. 8, 2018 @ 5:00 PM," and renaming the Oracle redo log snapshot identified by snap/18/01/08/1800/ordl with the Oracle recovery manager 132's name "Oracle redo logs Jan. 8, 2018 @ 6:00 PM."

Having renamed at least one snapshot, the system 100 can mount at least one snapshot to any host that is accessible to a native interface. By way of example and without limitation, this can include the EMC Networker application 142 mounting the Oracle database snapshot renamed with the Oracle recovery manager 132's name "Oracle Database Jan. 8, 2018 @ 5:00 PM," the Oracle redo log snapshot renamed with the Oracle recovery manager 132's name "Oracle redo logs Jan. 8, 2018 @ 5:00 PM," and the Oracle redo log snapshot renamed with the Oracle recovery manager 132's name "Oracle redo logs Jan. 8, 2018 @ 6:00 PM" to the first server 108.

After mounting at least one snapshot, the system 100 can enable a native interface to recover any database and/or any transaction logs stored on at least one storage device. In embodiments, this can include the EMC Networker application 142 enabling the Oracle recovery manager 120 interface to recover the Oracle database to the state it was in on Jan. 8, 2018, at 5:30 PM by using the Oracle database snapshot identified by snap/18/01/08/1700/odb, using the Oracle redo log snapshot identified by snap/18/01/08/1700/ordl, and using the Oracle redo log snapshot identified by snap/18/01/08/1800/ordl to roll the Oracle database forward to the state it was in on Jan. 8, 2018, at 5:30 PM. The native interface can read the data required for recovery directly from the mounted snapshots without knowing that the snapshots are mounted from a third-party's protection storage.

Following the mounting of at least one snapshot, the system 100 can enable a native interface to recover any transaction logs from a computer cluster. For example, and without limitation, this can include the EMC Networker application 142 enabling the Oracle recovery manager 120 to recover the Oracle database to the state it was in on Jan. 8, 2018, at 6:15 PM by using the Jan. 8, 2018 7:00 PM Oracle archived redo logs that are still stored on the computer cluster 116 to roll the Oracle database forward to the state it was in on Jan. 8, 2018, at 6:15 PM.

Having recovered at least one snapshot, the system 100 can unmount at least one snapshot. By way of example and without limitation, this can include the EMC Networker application 142 deporting and unmounting the 5:00 PM and 6:00 PM snapshots of the Oracle database and redo logs copied to and renamed on disk C of the protection storage 144.

Figure 2:
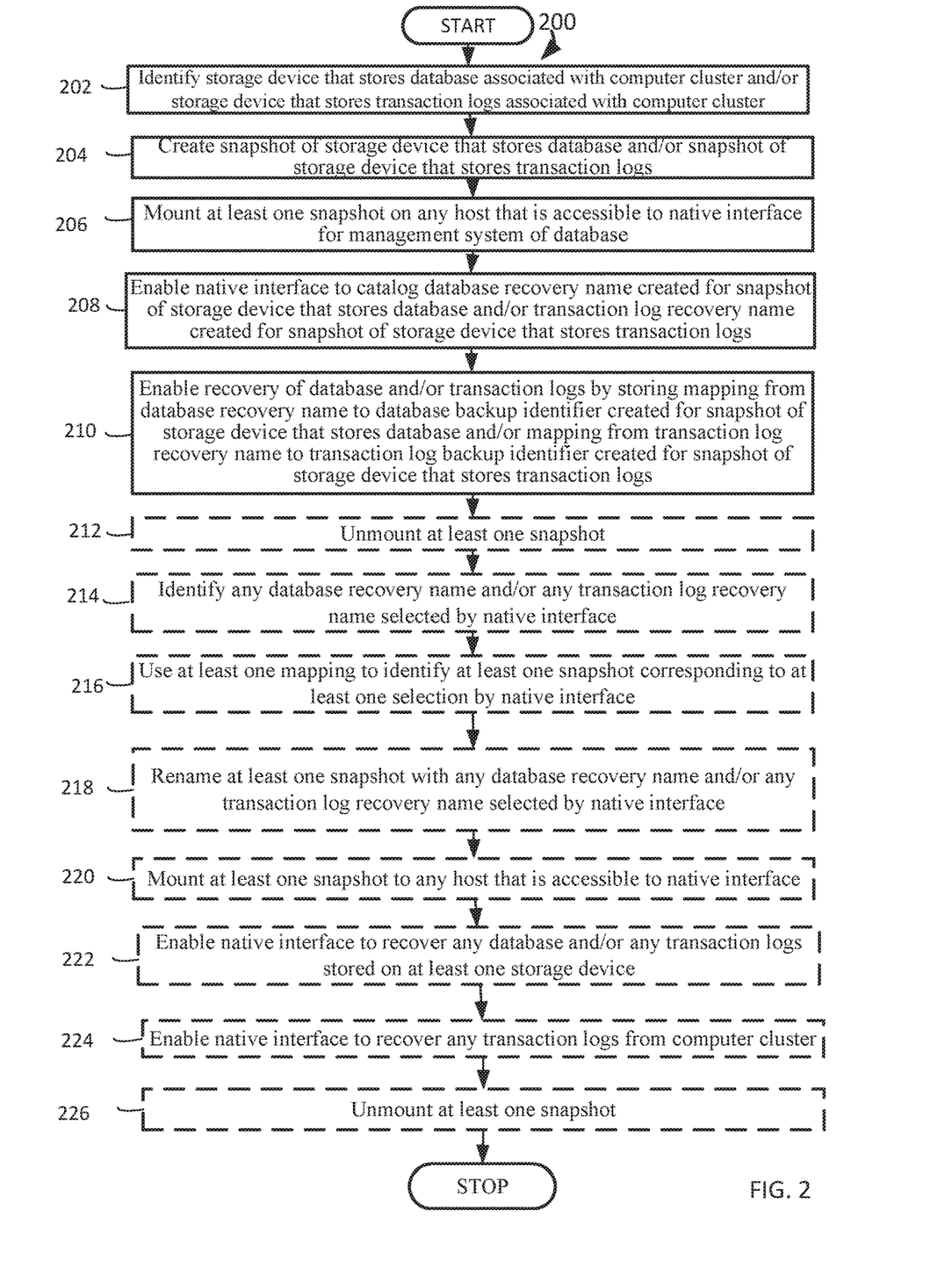
FIG. 2 is a flowchart that illustrates a method for snapshot backups of cluster databases, under an embodiment.

FIG. 2 is a flowchart that illustrates a method for snapshot backups of cluster databases, under an embodiment. Flowchart 200 illustrates method acts illustrated as flowchart blocks for certain steps involved in and/or between the clients 102-106 and/or the servers 108-114 of FIG. 1.

A storage device that stores a database associated with a computer cluster is identified and/or a storage device that stores transaction logs associated with the computer cluster is identified, block 202. The system 100 discovers storage devices for snapshotting. For example and without limitation, this can include the EMC Networker backup/restore application 142 discovering the computer cluster 116's logical groups 138 that store an Oracle database and Oracle archived redo logs, and mappings from the logical groups 138 to disk 1 for the Oracle database and to disk 2 for the Oracle archived redo logs.

Having identified a storage device that stores a database and/or a storage device that stores a transaction log, a snapshot of the storage device that stores the database is created and/or a snapshot of the storage device that stores transaction logs is created, block 204. The system 100 creates snapshots of cluster storage devices. By way of example and without limitation, this can include the EMC Networker application 142 creating a snapshot of disk 1 that stores the Oracle database and a snapshot of disk 2 that stores the Oracle archived redo logs.

After creating at least one snapshot, at least one snapshot is mounted on any host that is accessible to a native interface for a management system of the database, block 206. The system 100 mounts the snapshots of the database and/or transaction logs. In embodiments, this can include the EMC Networker application 142 mounting the short-term snapshots 140 on the third server 112 that is accessible to the third Oracle recovery manager 132.

Following the mounting of at least one snapshot, a native interface is enabled to catalog a database recovery name created for a snapshot of a storage device that stores a database and/or a transaction log recovery name created for a snapshot of a storage device that stores transaction logs, block 208. The system 100 enables the native interface to catalog the snapshots of the database and/or transaction logs. For example, and without limitation, this can include the EMC Networker application 142 prompting the Oracle recovery manager 132 to catalog the Oracle database snapshot under the name "Oracle Database Jan. 8, 2018 @ 5:00 PM" and the Oracle redo log snapshot under the name "Oracle redo logs Jan. 8, 2018 @ 5:00 PM."

Having cataloged at least one snapshot, recovery of a database and/or transaction logs is enabled by storing a mapping from a database recovery name to a database backup identifier created for a snapshot of a storage device that stores the database and/or a mapping from a transaction log recovery name to a transaction log backup identifier created for a snapshot of a storage device that stores the transaction logs, block 210. The system 100 maps the native interface's recovery names to the snapshots' backup identifiers. By way of example and without limitation, this can include the EMC Networker application 142 enabling recovery of the Oracle database and the Oracle archived redo logs by storing a mapping from the Oracle recovery manager 132's name "Oracle Database Jan. 8, 2018 @ 5:00 PM" to the EMC Networker identifier snap/18/01/08/1700/odb for the Oracle database snapshot stored in the long-term snapshots 146, and a mapping from the Oracle recovery manager 132's name "Oracle redo logs Jan. 8, 2018 @ 5:00 PM" to the EMC Networker identifier snap/18/01/08/1700/ordl for the Oracle redo log snapshot stored in the long-term snapshots 146.

After enabling recovery of at least one snapshot, at least one snapshot is optionally unmounted, block 212. The system 100 can unmount the recovery-enabled snapshots. In embodiments, this can include the EMC Networker application 142 unmounting the snapshots of the Oracle database and/or the Oracle transaction logs.

Following the snapshot backup process, any database recovery name and/or any transaction log recovery name selected by a native interface is optionally identified, block 214. The system 100 can identify recovery names for snapshot recovery. For example and without limitation, this can include the EMC Networker application 142 identifying the Oracle recovery manager 132's name "Oracle Database Jan. 8, 2018 @ 5:00 PM," the Oracle recovery manager 132's name "Oracle redo logs Jan. 8, 2018 @ 5:00 PM," and the Oracle recovery manager 132's name "Oracle redo logs Jan. 8, 2018 @ 6:00 PM" selected by the Oracle recovery manager 120.

Having identified at least one selection by a native interface, at least one mapping is optionally used to identify at least one snapshot corresponding to at least one selection by the native interface, block 216. The system 100 can map the native interface's selection to the snapshots. By way of example and without limitation, this can include the EMC Networker application 142 using the mapping from the Oracle recovery manager 132's name "Oracle Database Jan. 8, 2018 @ 5:00 PM" to the EMC Networker identifier snap/18/01/08/1700/odb for the Oracle database snapshot stored in the long-term snapshots 146, the mapping from the Oracle recovery manager 132's name "Oracle redo logs Jan. 8, 2018 @ 5:00 PM" to the EMC Networker identifier snap/18/01/08/1700/ordl for the Oracle redo log snapshot stored in the long-term snapshots 146, and the mapping from the Oracle recovery manager 132's name "Oracle redo logs Jan. 8, 2018 @ 6:00 PM" to the EMC Networker identifier snap/18/01/08/1800/ordl for the Oracle redo log snapshot stored in the long-term snapshots 146.

After identifying any corresponding snapshots, at least one snapshot is optionally renamed with any database recovery name and/or any transaction log recovery name selected by a native interface, block 218. The system 100 can use the native interface's recovery names to rename the snapshots. For example and without limitation, this can include the EMC Networker application 142 renaming the Oracle database snapshot identified by snap/18/01/08/1700/odb with the Oracle recovery manager 132's name "Oracle Database Jan. 8, 2018 @ 5:00 PM," renaming the Oracle redo log snapshot identified by snap/18/01/08/1700/ordl with the Oracle recovery manager 132's name "Oracle redo logs Jan. 8, 2018 @ 5:00 PM," and renaming the Oracle redo log snapshot identified by snap/18/01/08/1800/ordl with the Oracle recovery manager 132's name "Oracle redo logs Jan. 8, 2018 @ 6:00 PM."

Having renamed at least one snapshot, at least one snapshot is optionally mounted to any host that is accessible to a native interface, block 220. The system 100 can mount the snapshots renamed for the native interface. By way of example and without limitation, this can include the EMC Networker application 142 mounting the Oracle database snapshot renamed with the Oracle recovery manager 132's name "Oracle Database Jan. 8, 2018 @ 5:00 PM," the Oracle redo log snapshot renamed with the Oracle recovery manager 132's name "Oracle redo logs Jan. 8, 2018 @ 5:00 PM," and the Oracle redo log snapshot renamed with the Oracle recovery manager 132's name "Oracle redo logs Jan. 8, 2018 @ 6:00 PM.

After mounting at least one snapshot, a native interface is optionally enabled to recover any database and/or any transaction logs stored on at least one storage device, block 222. The system 100 can enable the native interface to recover the database and/or transaction logs from mounted snapshots. In embodiments, this can include the EMC Networker application 142 enabling the Oracle recovery manager 120 interface to recover the Oracle database to the state it was in on Jan. 8, 2018, at 5:30 PM by using the Oracle database snapshot identified by snap/18/01/08/1700/odb, the Oracle redo log snapshot identified by snap/18/01/08/1700/ordl, and the Oracle redo log snapshot identified by snap/18/01/08/1800/ordl.

Following the mounting of at least one snapshot, a native interface is optionally enabled to recover any transaction logs from a computer cluster, block 224. The system 100 can enable the native interface to recover the database and/or transaction logs that are still stored on the computer cluster's storage. For example, and without limitation, this can include the EMC Networker application 142 enabling the Oracle recovery manager 120 to recover the Oracle database to the state it was in on Jan. 8, 2018, at 6:15 PM by using the Jan. 8, 2018 7:00 PM Oracle archived redo logs that are still stored on the computer cluster 116.

Having recovered at least one snapshot, at least one snapshot is optionally unmounted, block 226. The system 100 can unmount the recovered snapshots. By way of example and without limitation, this can include the EMC Networker application 142 unmounting the snapshots copied and renamed on disk C of the protection storage 144.

Although FIG. 2 depicts the blocks 202-226 occurring in a specific order, the blocks 202-226 may occur in another order. In other implementations, each of the blocks 202-226 may also be executed in combination with other blocks and/or some blocks may be divided into a different set of blocks.

Figure 3:
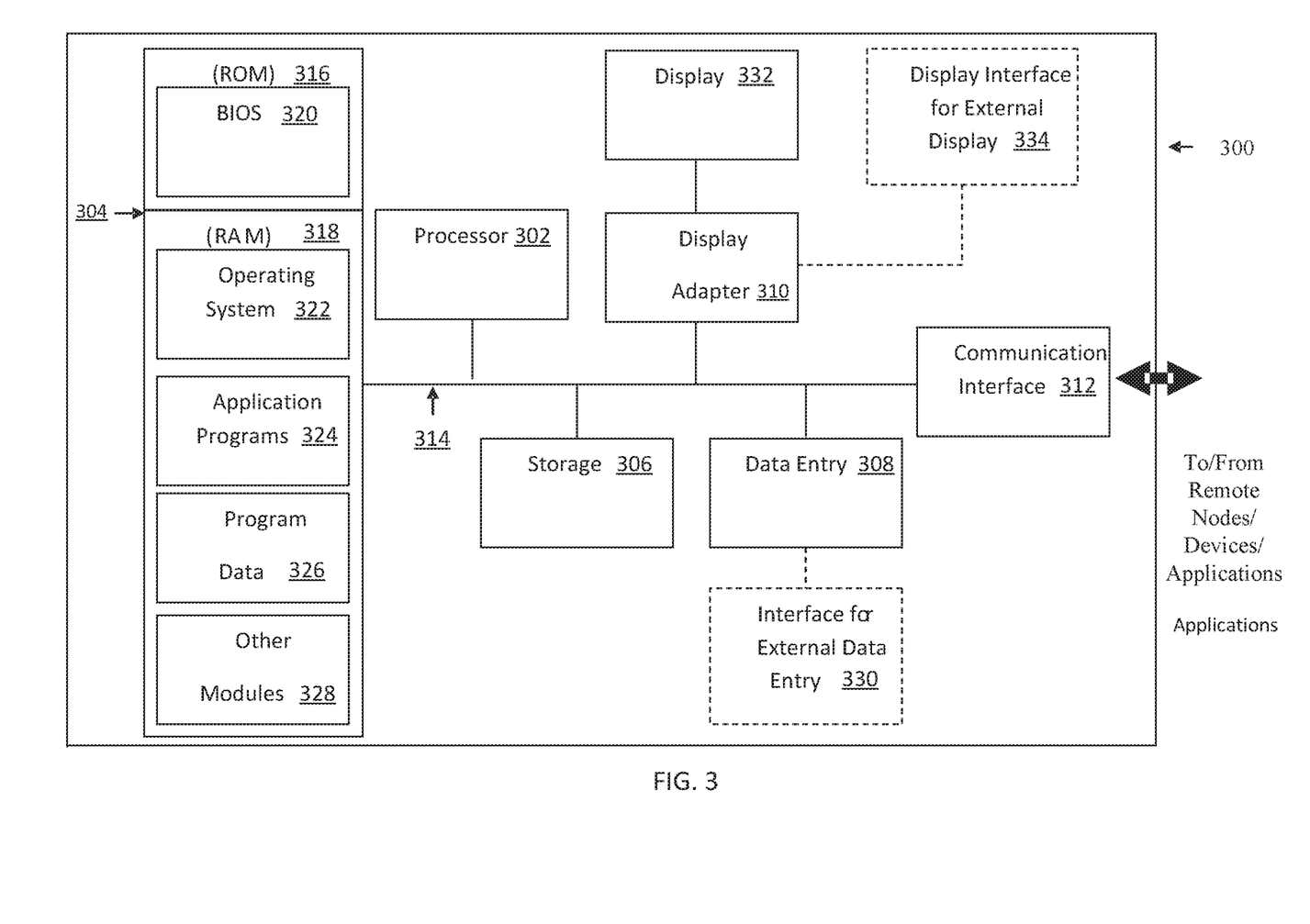
FIG. 3 is a block diagram illustrating an example hardware device in which the subject matter may be implemented.

Having describes the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, data entry module 308, display adapter 310, communication interface 312, and a bus 314 that couples elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in memory 304 and/or storage 306 and/or received via data entry module 308.

The memory 304 may include read only memory (ROM) 316 and random access memory (RAM) 318. Memory 304 may be configured to store program instructions and data during operation of device 300. In various embodiments, memory 304 may include any of a variety of memory technologies such as static random access memory (SRAM)

or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 304 may also include nonvolatile memory technologies such as nonvolatile flash RAM (NVRAM) or ROM. In some embodiments, it is contemplated that memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, ROM 316 or RAM 318, including an operating system 322, one or more applications programs 324, program data 326, and other program modules 328. A user may enter commands and information into the hardware device 300 through data entry module 308. Data entry module 308 may include mechanisms such as a keyboard, a touch screen, a pointing device, etc. Other external input devices (not shown) are connected to the hardware device 300 via external data entry interface 330. By way of example and not limitation, external input devices may include a microphone, joystick, game pad, satellite dish, scanner, or the like. In some embodiments, external input devices may include video or audio input devices such as a video camera, a still camera, etc. Data entry module 308 may be configured to receive input from one or more users of device 300 and to deliver such input to processing unit 302 and/or memory 304 via bus 314.

A display 332 is also connected to the bus 314 via display adapter 310. Display 332 may be configured to display output of device 300 to one or more users. In some embodiments, a given device such as a touch screen, for example, may function as both data entry module 308 and display 332. External display devices may also be connected to the bus 314 via external display interface 334. Other peripheral output devices, not shown, such as speakers and printers, may be connected to the hardware device 300.

The hardware device 300 may operate in a networked environment using logical connections to one or more remote nodes (not shown) via communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 312 may include logic configured to support direct memory access (DMA) transfers between memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the preceding description, the subject matter was described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the preceding context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system comprising:
   one or more processors; and
   a non-transitory computer readable medium storing a plurality of instructions, which when executed, cause the one or more processors to:
   identify at least one of (1) a storage device that stores a database associated with a computer cluster or (2) a storage device that stores a plurality of transaction logs associated with the computer cluster;
   create at least one of (1) a snapshot of the storage device that stores the database or (1) a snapshot of the storage device that stores the plurality of transaction logs;
   mount, automatically, the at least one snapshot on a host in response to the creation of the at least one snapshot, the host being accessible to a native interface for a management system of the database;
   transmit a prompt to the native interface, the prompt including instructions to catalog at least one of (1) a database recovery name created for the snapshot of the storage device that stores the database or (2) a transaction log recovery name created for the snapshot of the storage device that stores the plurality of transaction logs; and
   store at least one of (1) a mapping from the database recovery name to a database backup identifier created for the snapshot of the storage device that stores the database or (2) a mapping from the transaction log recovery name to a transaction log backup identifier created for the snapshot of the storage device that stores the plurality of transaction logs, wherein storing the at least one mapping enables recovery of at least one of the database or the plurality of transaction logs.

2. The system of claim 1, wherein identifying at least one of the storage device that stores the database or the storage device that stores the plurality of transaction logs comprises identifying a logical group that stores the database and a logical group that stores the plurality of transaction logs and then identifying at least one of a mapping of the logical group that stores the database to the storage device that stores the database or a mapping of the logical group that stores the plurality of transaction logs to the storage device that stores the plurality of transaction logs.

3. The system of claim 1, wherein creating at least one of the snapshot of the storage device that stores the database or the snapshot of the storage device that stores the plurality of transaction logs comprises quiescing the database before creating the snapshot of the storage device that stores the database and then un-quiescing the database after creating the snapshot of the storage device that stores the database.

4. The system of claim 1, wherein creating at least one of the snapshot of the storage device that stores the database or the snapshot of the storage device that stores the plurality of transaction logs comprises copying at least one of the snapshot of the storage device that stores the database or the snapshot of the storage device that stores the plurality of transaction logs to a remote storage.

5. The system of claim 1, wherein the processor-based application further causes the processor to:
   identify at least one of any database recovery name or any transaction log recovery name selected by the native interface;
   use at least one mapping to identify at least one snapshot corresponding to the at least one selection by the native interface;
   rename the at least one snapshot with at least one of any database recovery name or any transaction log recovery name selected by the native interface;
   mount the at least one snapshot to a host, the host being accessible to the native interface, wherein
   the native interface to recovers at least one of any database or any plurality of transaction logs stored on the at least one storage device.

6. The system of claim 5, wherein the processor-based application further causes the processor to enable the native interface to recover any plurality of transaction logs from the computer cluster.

7. The system of claim 1, wherein the processor-based application further causes the processor to unmount the at least one snapshot.

8. A method comprising:
   identifying at least one of (1) a storage device that stores a database associated with a computer cluster or (2) a storage device that stores a plurality of transaction logs associated with the computer cluster;

creating at least one of (1) a snapshot of the storage device that stores the database or (1) a snapshot of the storage device that stores the plurality of transaction logs;

mounting, automatically, the at least one snapshot on a host in response to the creation of the at least one snapshot, the host being accessible to a native interface for a management system of the database;

transmitting a prompt to the native interface, the prompt including instructions to catalog at least one of (1) a database recovery name created for the snapshot of the storage device that stores the database or (2) a transaction log recovery name created for the snapshot of the storage device that stores the plurality of transaction logs; and storing at least one of (1) a mapping from the database recovery name to a database backup identifier created for the snapshot of the storage device that stores the database or (2) a mapping from the transaction log recovery name to a transaction log backup identifier created for the snapshot of the storage device that stores the plurality of transaction logs, wherein storing the at least one mapping enables recovery of at least one of the database or the plurality of transaction logs.

9. The method of claim 8, wherein identifying at least one of the storage device that stores the database or the storage device that stores the plurality of transaction logs comprises identifying a logical group that stores the database and a logical group that stores the plurality of transaction logs and then identifying at least one of a mapping of the logical group that stores the database to the storage device that stores the database or a mapping of the logical group that stores the plurality of transaction logs to the storage device that stores the plurality of transaction logs.

10. The method of claim 8, wherein creating at least one of the snapshot of the storage device that stores the database or the snapshot of the storage device that stores the plurality of transaction logs comprises quiescing the database before creating the snapshot of the storage device that stores the database and then un-quiescing the database after creating the snapshot of the storage device that stores the database.

11. The method of claim 8, wherein creating at least one of the snapshot of the storage device that stores the database or the snapshot of the storage device that stores the plurality of transaction logs comprises copying at least one of the snapshot of the storage device that stores the database or the snapshot of the storage device that stores the plurality of transaction logs to a remote storage.

12. The method of claim 8, wherein the method further comprises:

identifying at least one of (1) any database recovery name or (2) any transaction log recovery name selected by the native interface;

using at least one mapping to identify at least one snapshot corresponding to the at least one selection by the native interface;

renaming the at least one snapshot with at least one of any database recovery name or any transaction log recovery name selected by the native interface;

mounting the at least one snapshot to a host, the host being accessible to the native interface, wherein the native interface to recovers at least one of any database or any plurality of transaction logs stored on the at least one storage device.

13. The method of claim 12, wherein the method further comprises:

enabling the native interface to recover any plurality of transaction logs from the computer cluster; and unmounting the at least one snapshot.

14. A computer program product, comprising a non-transitory computer-readable medium having a computer-readable program code embodied therein to be executed by one or more processors, the program code including instructions to:

identify at least one of (1) a storage device that stores a database associated with a computer cluster or (2) a storage device that stores a plurality of transaction logs associated with the computer cluster;

create at least one of (1) a snapshot of the storage device that stores the database or (1) a snapshot of the storage device that stores the plurality of transaction logs;

mount, automatically, the at least one snapshot on a host in response to the creation of the at least one snapshot, the host being accessible to a native interface for a management system of the database;

transmit a prompt to the native interface, the prompt including instructions to catalog at least one of (1) a database recovery name created for the snapshot of the storage device that stores the database or (2) a transaction log recovery name created for the snapshot of the storage device that stores the plurality of transaction logs; and store at least one of (1) a mapping from the database recovery name to a database backup identifier created for the snapshot of the storage device that stores the database or (2) a mapping from the transaction log recovery name to a transaction log backup identifier created for the snapshot of the storage device that stores the plurality of transaction logs, wherein storing the at least one mapping enables recovery of at least one of the database or the plurality of transaction logs.

15. The computer program product of claim 14, wherein identifying at least one of the storage device that stores the database or the storage device that stores the plurality of transaction logs comprises identifying a logical group that stores the database and a logical group that stores the plurality of transaction logs and then identifying at least one of a mapping of the logical group that stores the database to the storage device that stores the database or a mapping of the logical group that stores the plurality of transaction logs to the storage device that stores the plurality of transaction logs.

16. The computer program product of claim 14, wherein creating at least one of the snapshot of the storage device that stores the database or the snapshot of the storage device that stores the plurality of transaction logs comprises quiescing the database before creating the snapshot of the storage device that stores the database and then un-quiescing the database after creating the snapshot of the storage device that stores the database.

17. The computer program product of claim 14, wherein creating at least one of the snapshot of the storage device that stores the database or the snapshot of the storage device that stores the plurality of transaction logs comprises copying at least one of the snapshot of the storage device that stores the database or the snapshot of the storage device that stores the plurality of transaction logs to a remote storage.

18. The computer program product of claim 14, wherein the program code includes further instructions to:

identify at least one of (1) any database recovery name or (2) any transaction log recovery name selected by the native interface;

use at least one mapping to identify at least one snapshot corresponding to the at least one selection by the native interface;

rename the at least one snapshot with at least one of (1) any database recovery name or (2) any transaction log recovery name selected by the native interface;

mount the at least one snapshot to a host, the host being accessible to the native interface, wherein the native interface to recovers at least one of any database or any plurality of transaction logs stored on the at least one storage device.

19. The computer program product of claim 14, wherein the program code includes further instructions to enable the native interface to recover any plurality of transaction logs from the computer cluster.

20. The computer program product of claim 14, wherein the program code includes further instructions to unmount the at least one snapshot.

* * * * *